Nov. 10, 1953

F. J. BAUME 2,658,632

MECHANICAL AUTO PARK

Filed Dec. 11, 1947

INVENTOR.
F. J. BAUME
BY Victor J. Evans & Co.
ATTORNEYS

Nov. 10, 1953  F. J. BAUME  2,658,632
MECHANICAL AUTO PARK
Filed Dec. 11, 1947  6 Sheets-Sheet 2

INVENTOR.
F. J. BAUME
BY Victor J. Evans & Co.
ATTORNEYS

Nov. 10, 1953 F. J. BAUME 2,658,632
MECHANICAL AUTO PARK
Filed Dec. 11, 1947 6 Sheets-Sheet 3
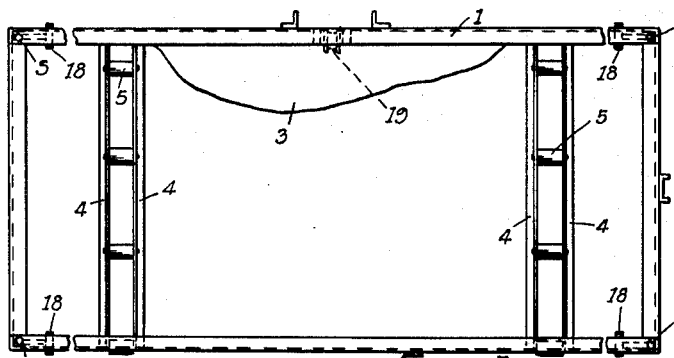
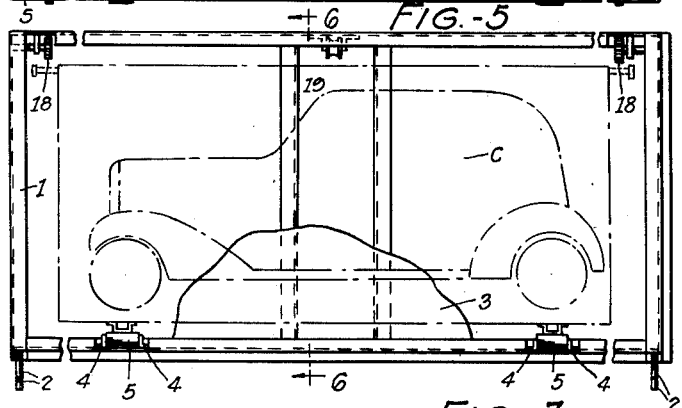
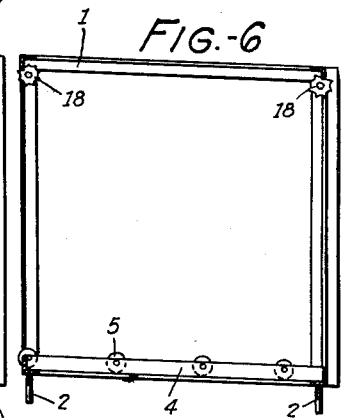
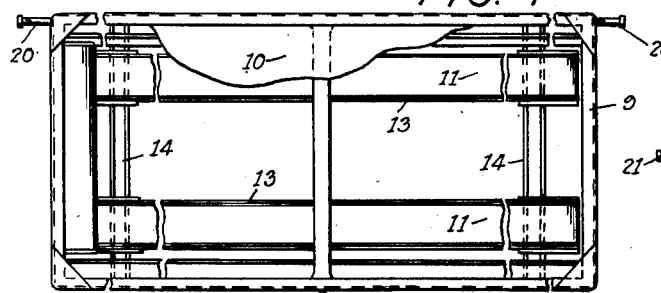
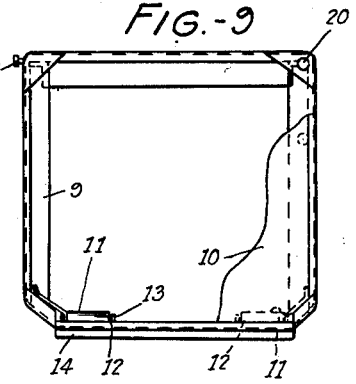
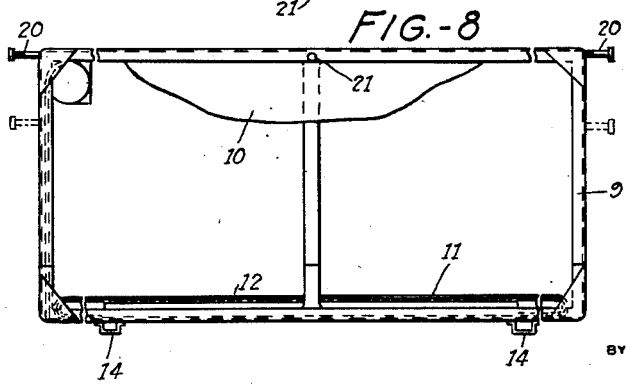
INVENTOR.
F. J. BAUME
BY Victor J. Evans & Co.
ATTORNEYS Nov. 10, 1953 — F. J. BAUME — 2,658,632
MECHANICAL AUTO PARK
Filed Dec. 11, 1947 — 6 Sheets-Sheet 4
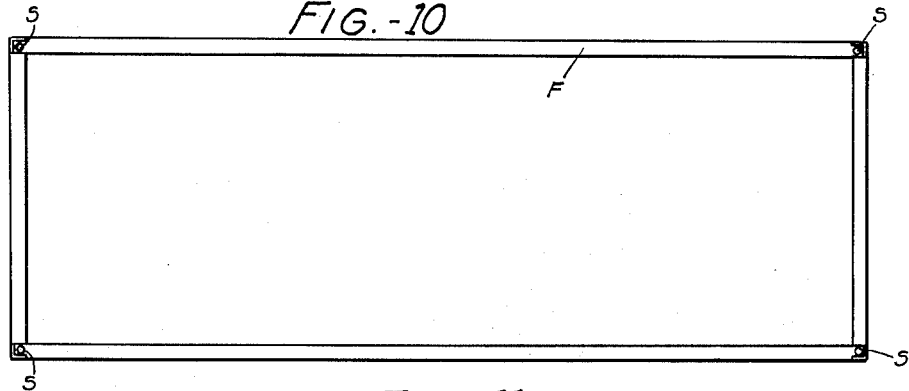
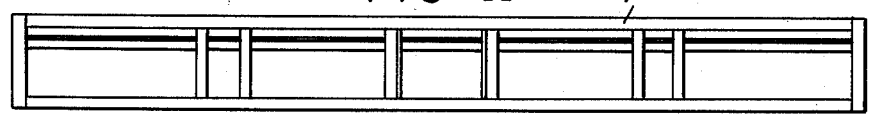
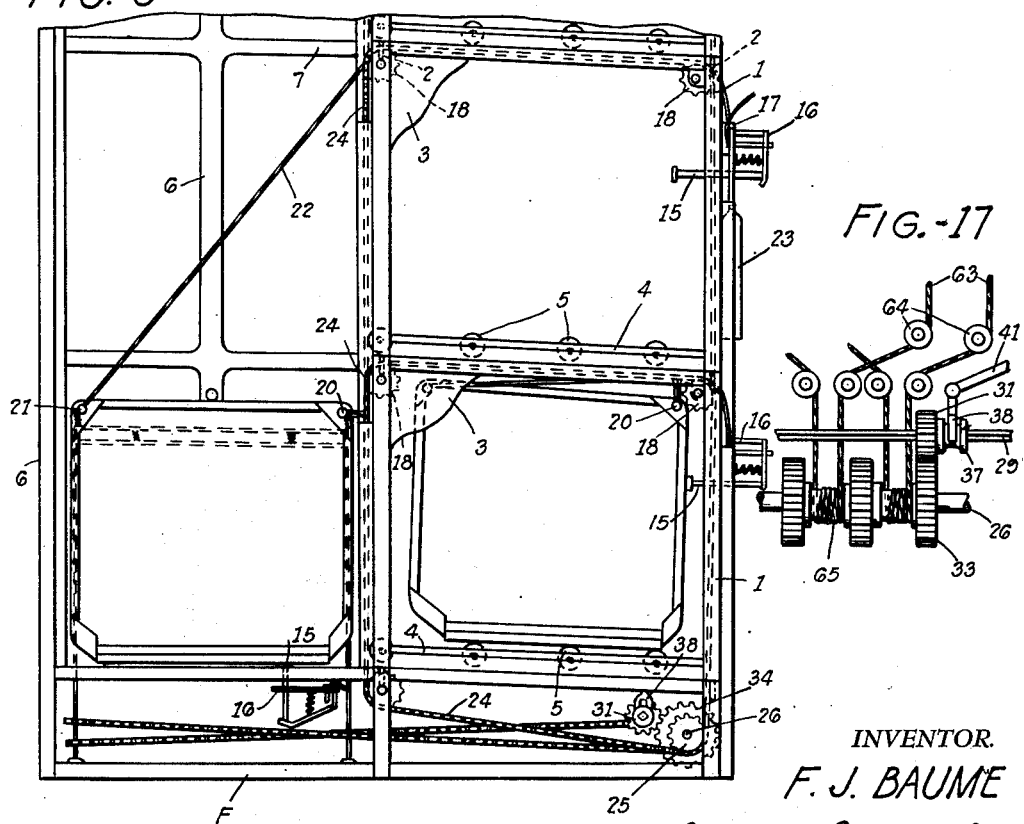
INVENTOR.
F. J. BAUME
BY Victor J. Evans & Co.
ATTORNEYS

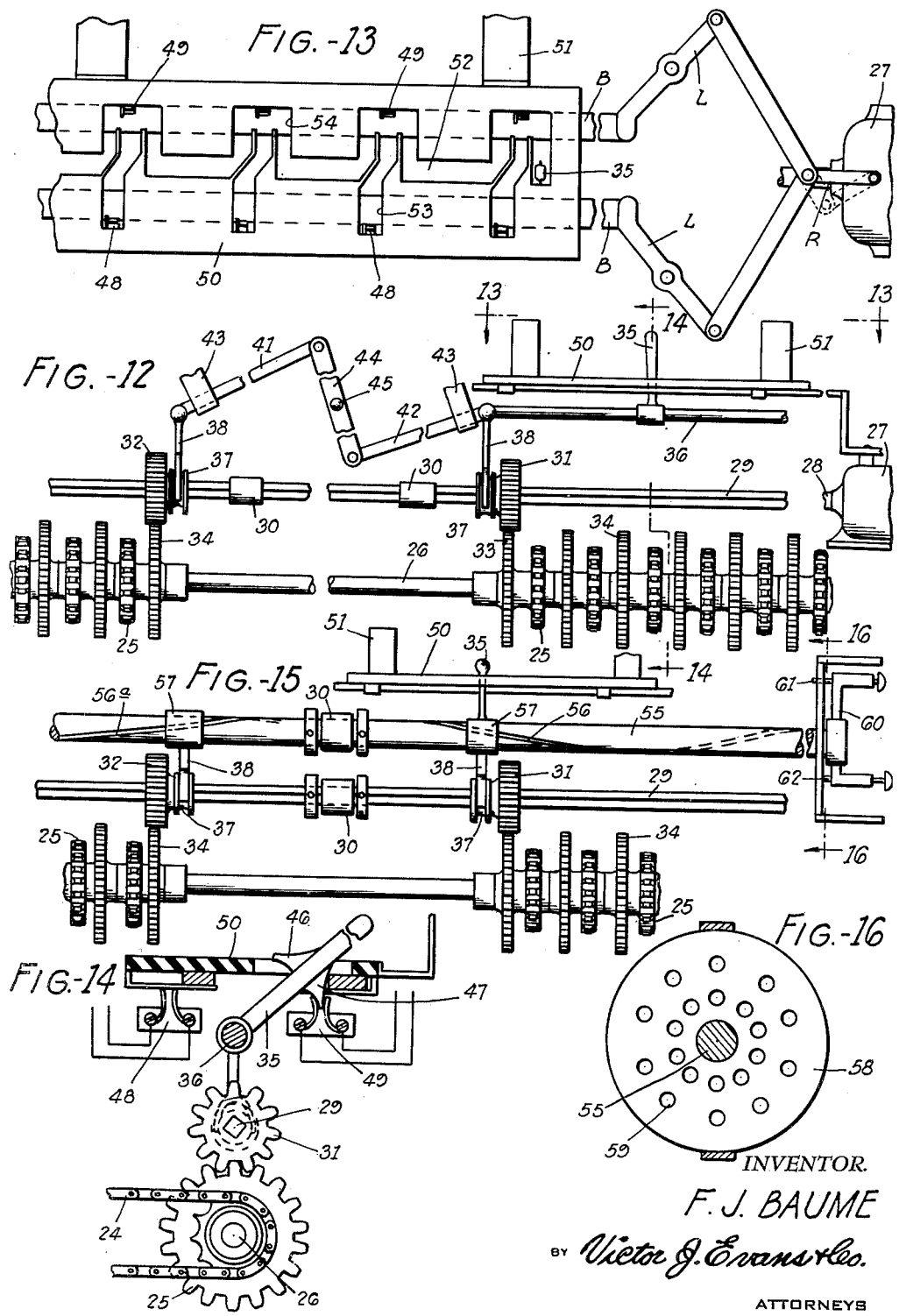

Nov. 10, 1953   F. J. BAUME   2,658,632
MECHANICAL AUTO PARK
Filed Dec. 11, 1947   6 Sheets-Sheet 6
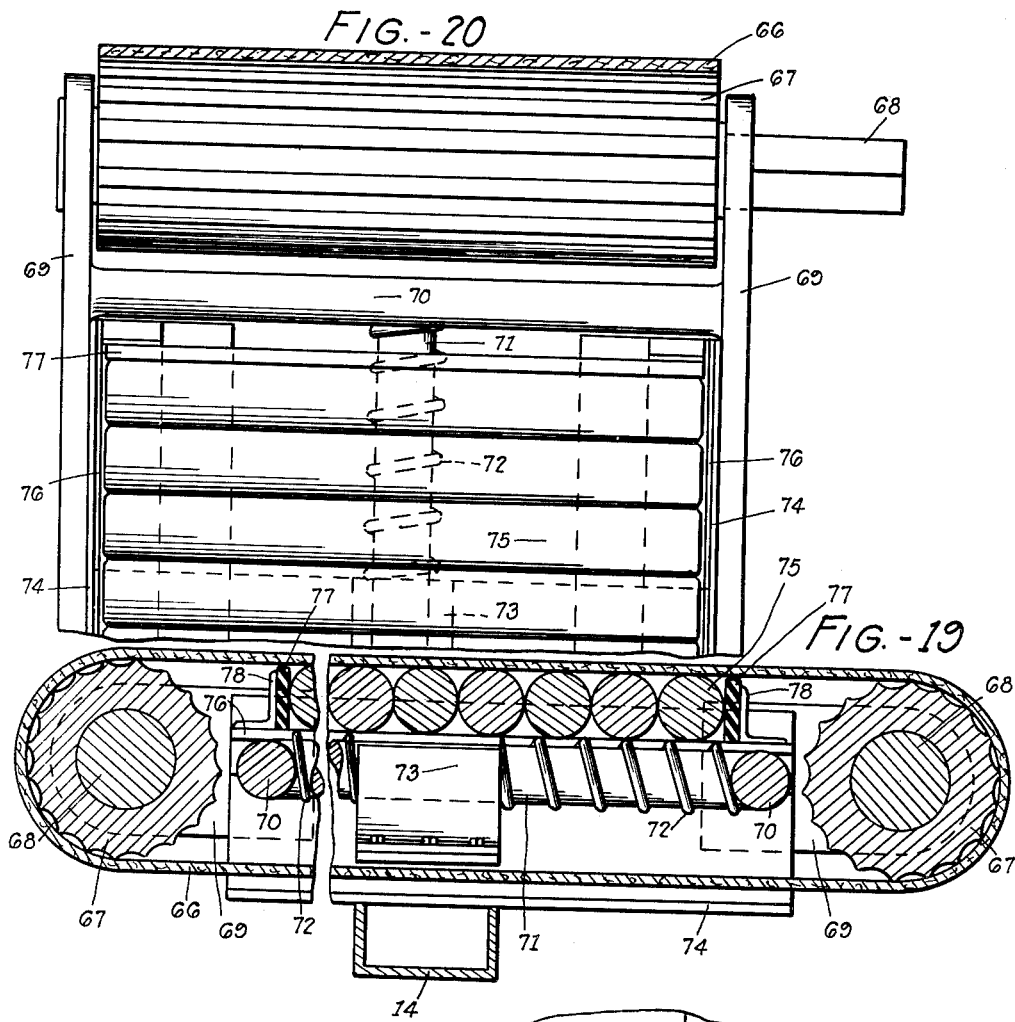
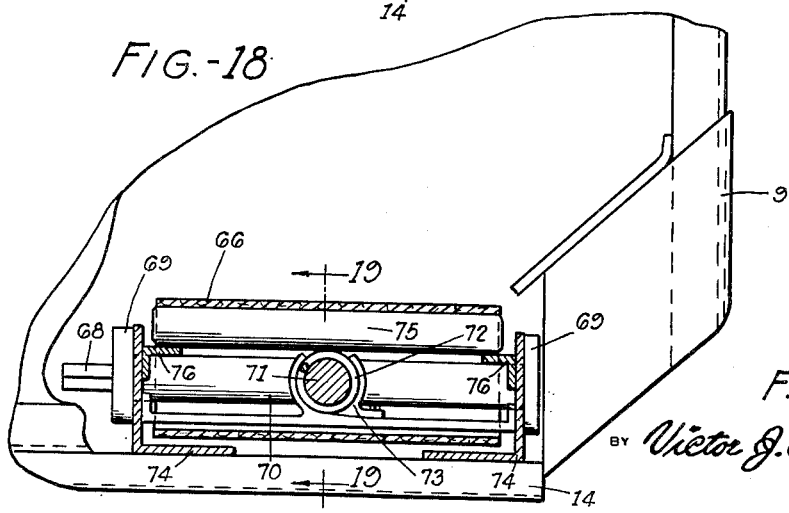
INVENTOR.
F. J. BAUME
BY Victor J. Evans & Co.
ATTORNEYS Patented Nov. 10, 1953

2,658,632

UNITED STATES PATENT OFFICE 2,658,632

MECHANICAL AUTO PARK

Frank J. Baume, Bakersfield, Calif.

Application December 11, 1947, Serial No. 790,977

3 Claims. (Cl. 214—16.1)

1

My present invention relates generally to material or article handling, of the type employing charging and discharging apparatus for wheeled vehicles in combination with storehouses, and more specifically to a mechanical automobile parking system that includes stacks or units, preferably made up and erected in complementary tiers to provide a frame-work of storage sections or compartments for the reception and storage of cages in which the automobiles or cars are individually stored.

The stacks or tiers may be erected within an enclosed building structure, or upon an open lot or lots, and the number of stacks may be varied; the number of tiers constituting a stack may be changed and the number of storage compartments may be altered, to suit different conditions.

In combination with the multiple storage compartments a complementary number of cages or elevators for storing automobiles or cars are provided, and each cage or elevator is equipped with means for raising and lowering, and laterally transferring or shifting the loaded elevator or cage. Motor operated means are provided for each cage, and selective control mechanism manipulated at a single station is employed for operating a selected cage.

A minimum number of pre-fabricated and standardized parts are employed which may be manufactured with facility at low cost of production, and assembled with convenience, to constitute a smooth-working appliance by means of which a number of incoming and outgoing cars may be handled with a minimum expenditure of time and labor, and without confusion.

The invention consists in certain novel features of construction and combinations and arrangements of parts as will hereinafter be described and more particularly set forth in the appended claims.

In the accompanying drawings I have illustrated a complete example of a physical embodiment of my invention in which the parts are combined and arranged in accord with one mode I have devised for the practical application of the principles of the invention. It will however be understood that changes and alterations are contemplated and may be made in these exemplifying drawings and mechanical as well as electrical structures, as is evidenced by the modifications disclosed, within the scope of my claims without departing from the principles of the invention.

Figure 3 is a detail elevation illustrating a motor operated carrying-cage or elevator and two of the motor control switches.

Figures 4, 5, and 6, are respectively, a plan view, a front elevation, and a vertical sectional view at line 6—6 of Fig. 5 of one of the frame sections or storage compartments.

Figures 7, 8, and 9, are respectively, a plan view, a front elevation, and an end elevation of a carrying cage or elevator.

Figures 10 and 11 show a plan view and a side view of a base-section for the two tier stack.

Figure 12 is a view in elevation showing the motor operated driving shaft, the conveyor shaft and selectively controlled power transmission mechanism; and Figure 13 is a plan view at line 13—13 Fig. 12 showing portion of the switch board and multi-control switches for the electric motor; and Figure 14 is a sectional view at line 14—14 of Fig. 12.

Figure 15 is a view in elevation of a modified form of the selective control mechanism; and Figure 16 is a sectional view at line 16—16 of Fig. 15.

Figure 17 is a detail view showing multi-cables in lieu of conveyor chains for the carrying-cages or elevators.

Figures 18, 19, and 20, are respectively, a transverse sectional view of an endless drive-way for a frame section or storage compartment; an enlarged longitudinal vertical sectional view at line 19—19 of Fig. 18; and a partial plan view.

Figure 1:
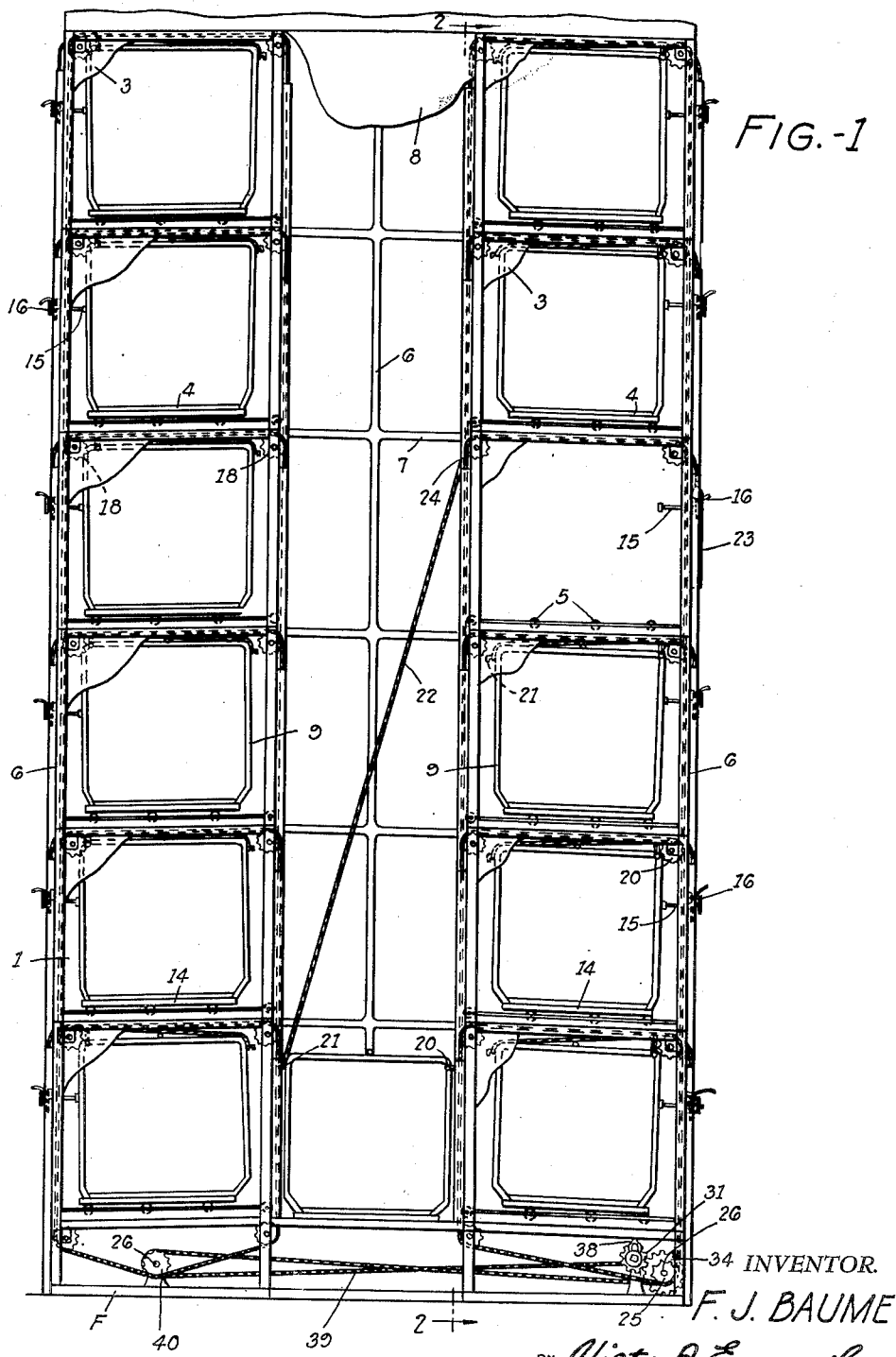
Figure 1 is a view in front elevation of a storage structure embodying my invention in a stack of two laterally spaced tiers each including six storage compartments or frame sections.
Figure 2:
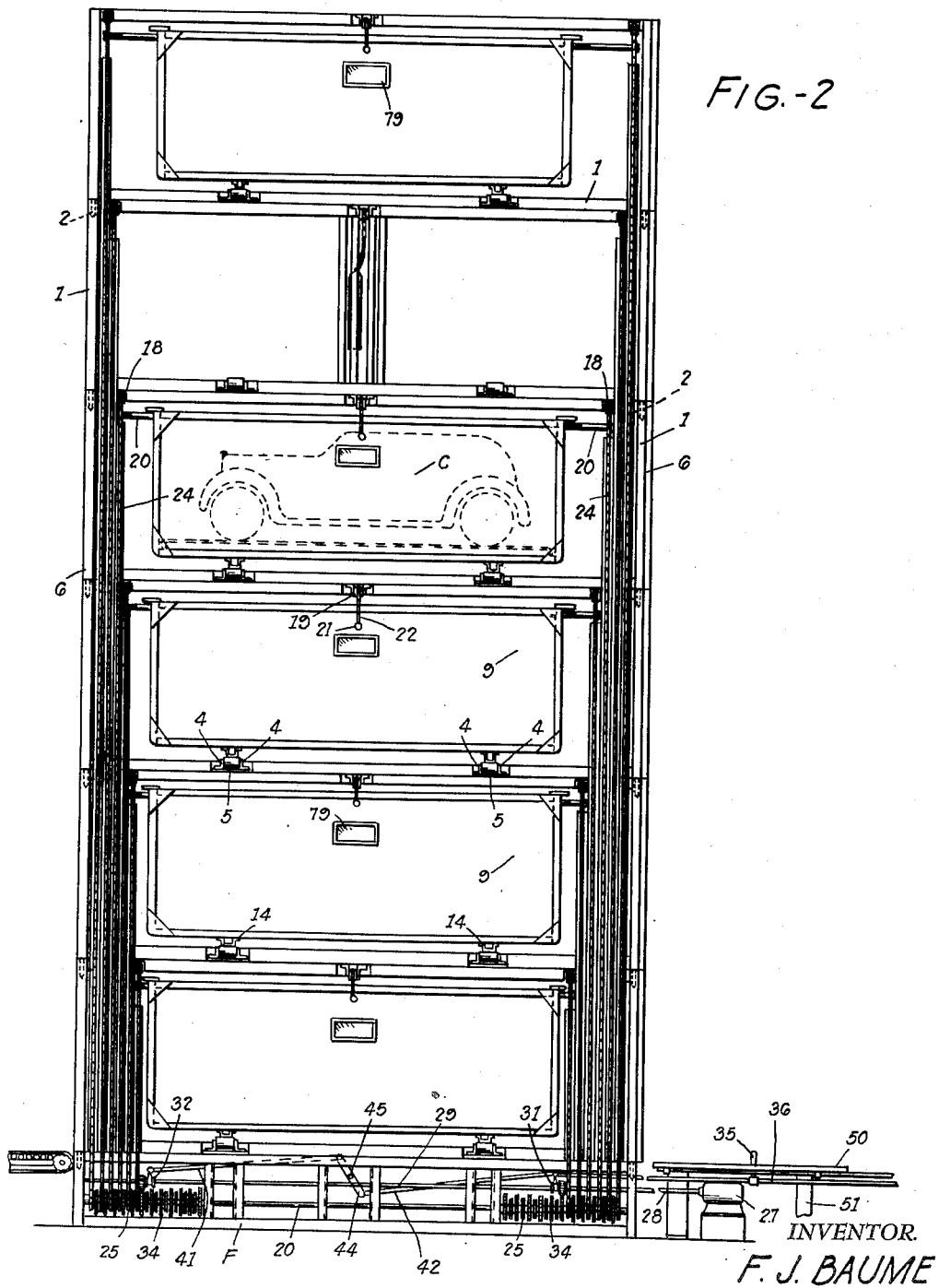
Figure 2 is a view in side elevation of a tier indicating by dotted lines an automobile or car in storage.

In order that the construction and operation of the storing and parking structure of my invention may readily be understood I have shown in the assembly views Figs. 1 and 2 of the drawings one storage unit as an example which consists of a double or duplex arrangement of two laterally spaced stacks, each made up and erected of superimposed tiers, with an intermediate alley or drive way for the cars.

Incoming and outgoing cars are transferred, laterally, from the driveway to selected compartments of the stacks, and from the compartments to the driveway at the ground level, or floor; and an elevating mechanism is selectively employed for raising and lowering the cars to and from the compartments, in combination with the transferring movements of the cars.

The horizontal area and the height of the storage structure may be varied as to size and shape of the structure by the addition of complementary units, and if desired or necessary, an exterior housing may be erected to enclose the open frame-work or skeleton frame, especially when the structure is erected on a vacant lot.

As here shown, each unit is equipped with motor operated mechanism for handling the cars, and a single attendant is employed at a central control station for manipulating selective electrical controls for the operation of the mechanism.

The rectangular metallic frame sections forming the individual storing compartments are pre-fabricated, preferably of angle iron or other bars, and the two complementary tiers of sections forming this twelve compartment stack are handled and erected by the use of suitable hoisting mechanisms upon a rectangular base frame or section F, which is best seen in Figs. 10 and 11, and provided with a series of vertically disposed sockets as S.

The pre-fabricated frame sections as detailed in Figs. 4, 5, and 6, are of duplicate construction, except that the two ground level sections are not provided with the same equipment, and therefore a description of one section will suffice for all of the sections that are embodied in the two tiers forming the stack.

Each section, designated as a whole by the numeral 1, is an open steel frame of generally rectangular shape that is provided at its four corners with rigidly fixed studs or pins 2 depending therefrom, and the pins or studs of the two ground-level sections are fitted in the complementary sockets S of the base frame F.

Each section is also provided with a complementary number of sockets S similar to the sockets of the base frame, and these sockets extend downwardly from the upper frame or top frame of the section in alinement with the complementary pins or studs that project downwardly from the bottom of the section, in order that one section may readily be fitted to and erected upon another section.

As indicated in Fig. 4 each of the individual frame sections 1 may be provided with an exterior weather-proof housing 3 of sheet metal or other suitable material, which housing is omitted from the drawings in the interest of clarity in the disclosure, and the bottom portion of the section is equipped with an interior pair of spaced parallel roller-tracks each made up of a pair of cross-rails 4, 4, that are horizontally disposed and attached to the opposite sides of the storage frame; and a suitable number of conveyor rollers 5, 5, are journalled in the rails of the tracks.

After the sections have been erected, each of the two tiers forming the storage stack is equipped with an exterior open-work metallic frame consisting of upright beams 6 and horizontal beams 7, bolted together and erected upon and supported by the base section or frame F. This reinforcing frame unites the two tiers of the stack and it provides a substantial support for the nested frame sections; and as indicated in Fig. 1 the whole storage structure may be enclosed within a weather-proof housing 8, for protection when the stack is erected on an open lot.

Each of the storage compartments formed by the frame sections 1 is adapted to receive and contain a complementary transfer cage or elevator for the car C shown in Figs. 2 and 5 by dotted lines; and the cage or elevator with its enclosed car is shifted or transferred by suitable power-operated hoisting mechanism from the intermediate drive-way between the tiers into a storage section or compartment, and when desired the loaded cage may be transferred from its storage compartment to the drive-way for driving out.

The twelve cages forming a complement for the twelve-compartment storage stack are duplicated in construction and operation, and reference may be had especially to Figs. 7, 8, and 9 for a general description of one of the cages or transfer elevators.

Each rectangular or oblong-shaped cage is indicated as a whole by the number or numeral 9, and if desired, it may be enclosed by a housing 10, except for an open end that provides for entrance and exit of the car C. While the cage is located in the central drive-way a car is driven under its own power into the cage, and the latter is equipped with a pair of parallel longitudinally extending and laterally spaced endless tracks or belts 11, 11, that are mounted upon enclosed conveyor rollers 12 journaled in spaced rails 13 attached at the bottom frame-work of the cage; or in some instances the belts may be omitted and the rollers may be employed in lieu thereof for receiving and supporting the car C.

On the bottom of the cage a pair of transverse exterior traction rails or channel irons or plates 14, 14, are mounted or bolted, which, as seen in Fig. 5 are designed for co-action with the two complementary series of traction rollers 5, 5 of the frame section 1 for entering and withdrawing the loaded cage into and from its selected storage compartment.

Preferably the rails 4 and rollers 5 of a section for co-action with the rails 14 of the cage, as seen in Figs. 3 and 6, decline from the front entrance to the rear end of the frame in order that the entering cage will roll down hill to insure a safe storage position for the car, and at the end of the storage movement of the cage and car the cage contacts a movable arm 15 of an automatic electric signal switch 16 located on the frame. The signal switch is included in an electric light circuit which also includes a lamp 17 that is illuminated as the circuit is closed to indicate that the section is empty, and the lamp is extinguished by action of the entering car to indicate that the section or compartment is occupied.

For use in elevating each cage from the intermediate drive way and laterally storing it in its frame section or compartment, as well as for laterally withdrawing the cage from the storage compartment and depositing it in the drive way, each cage is equipped with a pair of endless conveyor chains, and for co-action with the chains each cage is also equipped with a compensating cable and counterweight, to facilitate these movements.

As best seen in Figs. 4, 5 and 6 the frame of each storage compartment is provided with pairs of guide sprockets 18 for the endless conveyor chains, and a pair of pulleys or sheaves 19 for the counterweighted cable.

Each cage at its opposite upper rear corners is equipped with a pair of oppositely extending and alined stud bolts 20, 20 for attachment or anchoring of the conveyor chains, and at the center of the upper far edge of the cage, a cable anchoring pin or bolt 21 is mounted.

As best seen in Fig. 3 a counterweighted cable 22 is anchored or attached to the stud bolt 21, and this cable passes upwardly, over the two guide pulleys or sheaves 19 of the frame section, and then the free end of the cable depends at the exterior of the section where it is equipped with the counterweight 23.

The two conveyor chains 24 for the cage are each attached or anchored to a stud bolt 20 and they pass over the guide sprockets 18 of the frame section, and thence to and around a drive sprocket 25 mounted upon a conveyor shaft 26 journaled in the base section of the stack, and thence to the anchoring stud bolt.

In Fig. 12 it will be seen that the conveyor shaft 26 is equipped at one end with a set of six drive sprockets 25, and the other end of the shaft is also equipped with six of these sprockets, of which three are disclosed, and the twelve conveyor chains of the twelve-compartment stack pass around and are driven individually and selectively from these two series of sprockets.

The prime mover for the conveyor chains is an electric motor 27 that is included in a power circuit, and it is reversible for raising and lowering the selected cage. The motor shaft 28 is equipped with an axial extension or countershaft 29 journaled in bearings 30, which as shown is angular or square in cross section, and disposed parallel with the conveyor shaft in the same vertical plane.

A pair of longitudinally shiftable pinions 31 and 32 are slidably mounted upon the countershaft, one to serve, selectively, each series or group of the conveyor chains; and the driving sprockets 25 are each provided with a rigid driven gear 34 by means of which power is selectively transmitted from the driving pinions 31, 32 to the gears 33 and their drive sprockets 25.

For selectively controlling the operation of the conveyor chains, the two drive pinions 31 and 32 are longitudinally shiftable on the countershaft or power shaft 29 by means of a single manually operated lever 35 that is rigidly mounted upon a partially rotatable and longitudinally shiftable rock shaft 36 that is supported in suitable bearings above the power shaft 29.

The two driving pinions are each equipped with a grooved or flanged collar 37, and a forked arm 38 rigid with the rock shaft or shifting bar mechanism, engages a collar for co-action in shifting the control mechanism.

In Figs. 2 and 12 one of two tiers of the stack is shown with its two sets of conveyor chains of varying length with which the superimposed cages are equipped; and in Fig. 1 a cross chain 39 transmits power from one conveyor chain shaft 26 to the second shaft 26 by means of sprocket wheel 40 to operate the cages of the second tier.

For mechanically connecting the forked lever arms 38—38 in Fig. 12, a pair of toggle links 41, 42 are supported in suitable bearings 43 and pivoted to the opposite ends of a rock arm 44 that is pivotally mounted at 45 on a suitable support.

By movement of the oscillatable and longitudinally slidable control lever 35 in selecting a conveyor chain for operation the operating motor 27 is also controlled, and for this purpose the control lever is equipped with a pair of spaced electrical contacts 46 and 47 best seen in Fig. 14 that move with the lever, and each cage is provided with a motor circuit adapted to be closed by means of one or the other of these contacts.

Twelve control switches 48 and 49, arranged in two groups of six each are mounted beneath a panel plate 50 that is supported in horizontal position by brackets 51, and this insulated plate is slotted longitudinally at 52 and provided with two sets of opposed transversely arranged notches 53 and 54 for accommodating the longitudinal and laterally oscillating movements of the control lever 35. Thus, by manipulating the control lever, a conveyor chain may be selected to operate the desired cage, and simultaneously the motor 27 is energized by closing of its control switch to actuate the conveyor chain and its cage; and when the cage is stored, the motor is cut off, automatically, through actuation of switch 15; and the lamp circuit is also opened to extinguish the lighted lamp of the cage.

When a stored car is removed and deposited in the drive way, the motor is also cut off, the car is driven from the cage, the empty cage is restored to its storage compartment and the signal lamp is lighted, or the empty cage may be left standing in the drive way to accommodate an incoming car.

The multiple control switches, in the twelve (more or less) electric controlling circuits for the motor may include a pair of laterally spaced parallel conductor bars B, B, supported beneath the switch board or panel 50 in Fig. 13, and these bars are each connected to pairs of toggle links as L, L that selectively operate the reversing switch R for controlling the reversible electric motor that selectively operates the various cages and their conveyor chains or cables.

Various changes and alterations may be made in these enumerated structures, as for instance in Figs. 15 and 16 a modified form of control mechanism is shown for the cages, where a rotary cam rod 55 is employed in lieu of the rod 36; and this cam rod is equipped with a right hand thread or cam groove 56 and a left hand groove as 56a, which co-act with the hubs 57 of the forked arms 38. On the cam shaft or rod 55 a selector disk 58 may be mounted and substituted for the operating or control lever 35, and the disk is provided with two concentric annular series of sockets 59 for use with a rotary selector 60 having contact pins 61, 62, for the multi-control switches of the motor.

An additional modification is shown in Fig. 17 where conveyor ropes or cables 63 for the cages are passed around guide pulleys or drums 64 as guides, and around winding and unwinding drums 65 on the power shaft 26.

In Figs. 18, 19, 20, an alternate arrangement is shown for a pair of tracks or endless belts that are mounted in each cage for receiving and supporting a car to be stored, and as here disclosed two horizontal endless track belts 66 are provided in the bottom of a cage, which pass around a pair of spaced rotary drums 67 having axles 68 that are journaled in opposed and complementary bearing frames 69, 69.

These belts are automatically stretched taut or tightened for supporting the wheels of the car C by a resilient tightener that includes a cross bar 70 of each of the two frames 69, which cross bar is provided with an integral stretcher bar or spring bar 71. Between the two axially alined and spaced spring bars 71 a pair of springs 72, 72 are mounted with the inner adjoining ends bearing against a central abutment 73 mounted on a main frame of angle irons 74, and the outer ends of the springs bear against the cross bars 70, 70 of the two frame sections 69.

The upper working flight of each belt is supported upon a series of transversely arranged rollers 75 that span the gap between a pair of laterally spaced angle rails 76, 76 of the main frame of the belts, and a pair of rubber bumpers 77, 77, erected against these rails absorbs lost motion of the rollers and maintains them in operative position for the working flight of the belt.

Various additional accessories may be employed in connection with the different elements of the apparatus, such as windows 79 for the cages, and a turn table may be employed in the drive way between the two tiers of the stack for convenience in handling the cars coming in and going out, and other devices and appliances are contemplated as are necessary for smooth working of the system of handling the car.

Having thus fully described my invention, what I claim as new and desire to secure by Letters Patent is:

1. In a parking structure for cars, the combination with a frame section forming an elevated storage compartment having a supporting track, of a car-cage supported on the track, a pair of endless conveyor chains anchored on one side of the cage and guides in the frame section and in the compartment for said chains, an equalizing cable anchored on the opposite side of the cage, guides for the cable mounted in the frame section and a counterbalancing weight suspended on the cable and motor operated mechanism for activating the endless conveyor chains.

2. In a parking structure for cars, the combination with a frame section forming an elevated storage compartment having a pair of laterally spaced roller-tracks, of a car-cage having laterally spaced traction rails mounted on the tracks, a pair of endless chain conveyors anchored on one side of the cage and guides in the frame section and in the compartment, for said chains, an equalizing cable anchored at an opposite side of the cage, guides mounted in the frame section for said cable and a suspending counterweight on the cable, and motor operated mechanism for activating the chains.

3. In a motor-operated mechanism for a pair of endless conveyor chains as described, the combination with a conveyor shaft having a plurality of pairs of spaced rotary gears and a sprocket wheel rigid with each gear for actuating the chains, of a power output shaft, a pair of spaced longitudinally adjustable pinions rotatable with the power shaft, a grooved hub rigid with each pinion, a forked shifting lever co-acting with each hub, manually operated means for shifting one lever, and operative connections between said levers for shifting the other lever.

FRANK J. BAUME.

References Cited in the file of this patent

UNITED STATES PATENTS

| Number | Name | Date |
| --- | --- | --- |
| 1,298,183 | D'Humy | Mar. 25, 1919 |
| 1,545,426 | Hoffman | July 7, 1925 |
| 1,584,212 | Burrell | May 11, 1926 |
| 1,856,288 | Ogle | May 3, 1932 |
| 1,882,656 | Creedon | Oct. 18, 1932 |
| 1,896,021 | Taylor | Jan. 31, 1933 |
| 1,902,790 | Starrett | Mar. 21, 1933 |
| 1,905,229 | James et al. | Apr. 25, 1933 |
| 1,905,230 | James et al. | Apr. 25, 1933 |
| 1,972,258 | Boyle | Sept. 4, 1934 |